United States Patent
Barkan

(10) Patent No.: US 7,757,955 B2
(45) Date of Patent: Jul. 20, 2010

(54) BAR CODE READER HAVING MULTIPLE CAMERAS

(75) Inventor: Edward D. Barkan, Miller Place, NY (US)

(73) Assignee: Symbol Technologies, Inc., Holtsville, NY (US)

(*) Notice: Subject to any disclaimer, the term of this patent is extended or adjusted under 35 U.S.C. 154(b) by 293 days.

(21) Appl. No.: 12/112,275

(22) Filed: Apr. 30, 2008

(65) Prior Publication Data

US 2009/0272810 A1  Nov. 5, 2009

(51) Int. Cl.
*G06K 7/10* (2006.01)

(52) U.S. Cl. .............. 235/462.01; 235/462.02; 235/462.03; 235/462.08; 235/462.09; 235/462.11; 235/462.14; 235/462.15; 235/462.17; 235/462.2; 235/462.41; 235/462.43; 235/462.44

(58) Field of Classification Search .................. 235/462.01–462.49, 472.01–472.03
See application file for complete search history.

(56) References Cited

U.S. PATENT DOCUMENTS

| | | | | |
|---|---|---|---|---|
| 5,717,195 A | | 2/1998 | Feng et al. | |
| 5,936,218 A | * | 8/1999 | Ohkawa et al. | 235/462.01 |
| 6,006,990 A | * | 12/1999 | Ye et al. | 235/454 |
| 6,340,114 B1 | | 1/2002 | Correa et al. | |
| 6,899,272 B2 | * | 5/2005 | Krichever et al. | 235/462.37 |
| 6,951,304 B2 | * | 10/2005 | Good | 235/462.32 |
| 2003/0102377 A1 | * | 6/2003 | Good | 235/462.32 |
| 2006/0022051 A1 | * | 2/2006 | Patel et al. | 235/462.14 |
| 2007/0001013 A1 | * | 1/2007 | Check et al. | 235/462.32 |

* cited by examiner

*Primary Examiner*—Thien M. Le
*Assistant Examiner*—Tuyen K Vo

(57) ABSTRACT

A multicamera imaging-based bar code reader for imaging a target bar code on a target object features: a housing supporting a plurality of transparent windows and defining an interior region, a target object being presented to the plurality of windows for imaging a target bar code; an imaging system including a plurality of camera assemblies coupled to an image processing system, each camera assembly of the plurality of camera assemblies being positioned within the housing interior position. Each camera assembly includes a sensor array and an imaging lens assembly for focusing a field of view of the camera assembly onto the sensor array. One or more processors prioritize an order of image capture or interpretation based upon user tendencies.

17 Claims, 7 Drawing Sheets

BAR CODE READER HAVING MULTIPLE CAMERAS

FIELD OF THE INVENTION

The present invention relates to a multiple camera imaging-based bar code reader.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to swiped. This typically happens when the swiped barcode failed to scan, so the operator tries a second time to scan it. Alternately, presentation is done by inexperience users, such as when the reader is installed in a self check out installation.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that has a plurality of imaging cameras can be referred to as a multi-camera imaging-based scanner or bar code reader. In a multi-camera imaging reader, each camera system typically is positioned behind one of the plurality of transparent windows such that it has a different field of view from every other camera system. While the fields of view may overlap to some degree, the effective or total field of view of the reader is increased by adding additional camera systems. Hence, the desirability of multicamera readers as compared to signal camera readers which have a smaller effective field of view and require presentation of a target bar code to the reader in a very limited orientation to obtain a successful, decodable image, that is, an image of the target bar code that is decodable.

The camera systems of a multi-camera imaging reader may be positioned within the housing and with respect to the transparent windows such that when a target object is presented to the housing for reading the target bar code on the target object, the target object is imaged by the plurality of imaging camera systems, each camera providing a different image of the target object. U.S. patent application Ser. No. 11/862,568 filed Sep. 27, 2007 entitled 'Multiple Camera Imaging Based Bar Code Reader' is assigned to the assignee of the present invention and is incorporated herein by reference.

SUMMARY OF THE INVENTION

The present disclosure concerns a multi-camera imaging-based bar code reader and a method of operating a multicamera imaging-based bar code reader.

It has been observed that users of such bar code readers become comfortable presenting the barcode to either the vertical or the horizontal window more frequently. That is, they don't tend to use both windows equally. In addition, users tend to position the barcode such that one of the cameras within a given window will have the best view of the barcode more often than others. In addition, the path over which the barcode is dragged through the field of view of the cameras has some consistency. For example, a user may concentrate the paths of travel of the barcodes near the center, or near one end of the field of view of the cameras. The part of the field of view or each camera that most often sees the barcode may differ. For example, the barcode may most often be visible near the center of the field of view of one camera, and most often near the upper edge of the field of view of another camera.

With use, the reader can learn what part of the field of view of each camera is most likely to contain a barcode based on statistics from past behavior of the user. Separate statistics can be maintained for each camera. A decoder is programmed to search first through the part of the field of view for each camera that has been found to most frequently contain a barcode image, increasing the probability of finding the barcode rapidly. In addition, the decoder can give priority to whichever camera or cameras have most frequently been found to contain a barcode for a given user.

In the event that a barcode isn't located in the area that has been found to be most common, the decoder can revert to a fixed search pattern that will eventually cover the entire field of view.

These and other objects, advantages, and features of the exemplary embodiment of the invention are described in detail in conjunction with the accompanying drawings.

DETAILED DESCRIPTION

Figure 7:
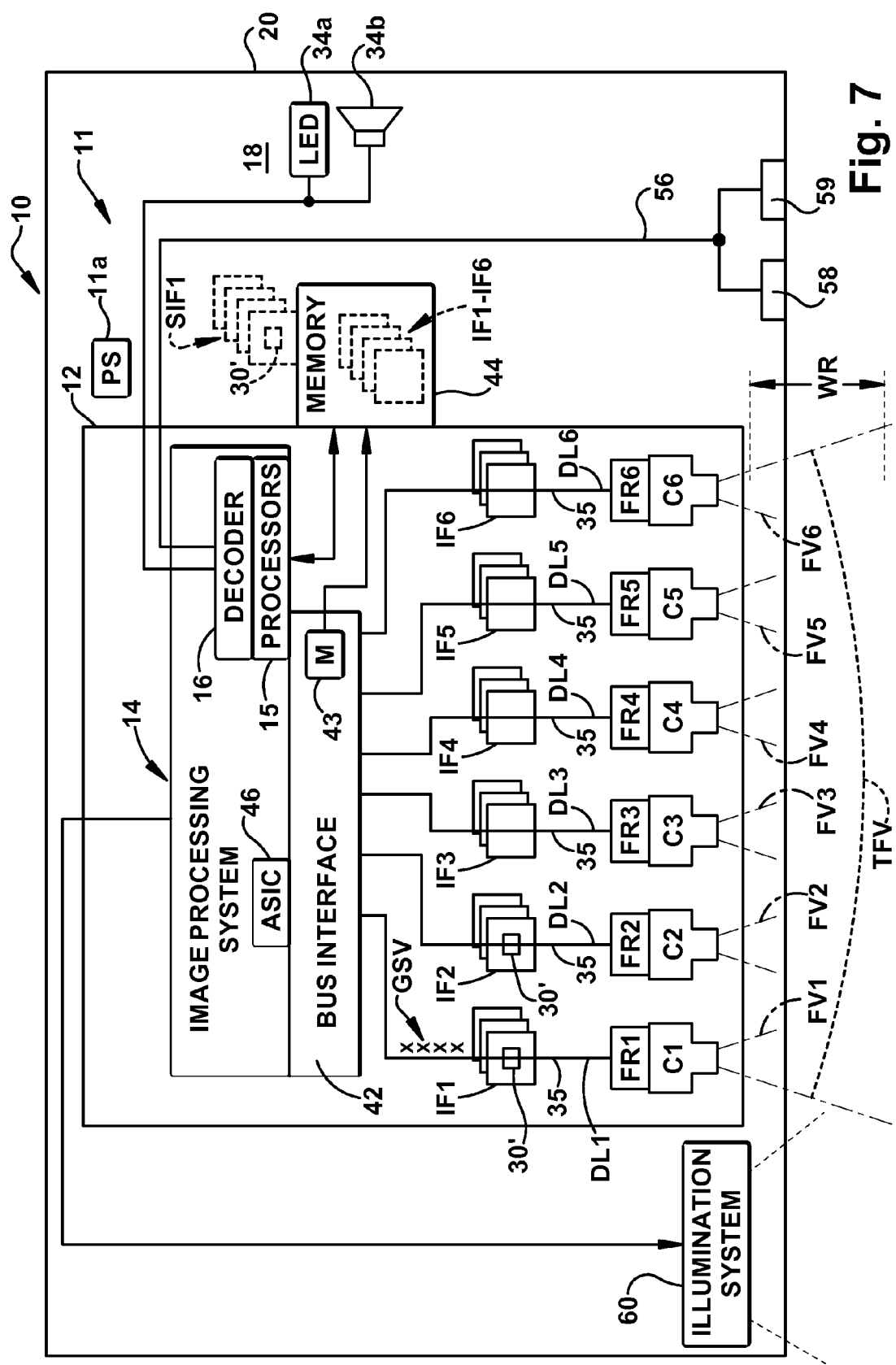
FIG. 7 is a schematic block diagram of selected systems and electrical circuitry of the bar code reader of FIG. 1.

An exemplary embodiment of a multicamera imaging-based bar code scanner or reader 10 of the present invention is shown schematically in the Figures. As depicted in FIG. 7, the bar code reader 10 includes circuitry 11 comprising an image system 12 which includes a plurality of imaging cameras C1, C2, C3, C4, C5, C6, which produce raw gray scale images, and an image processing system 14, which includes one or more processors 15 and a decoder 16 that analyzes the gray scale images from the cameras and decodes imaged target bar codes, if present. The imaging system 12 is capable of reading, that is, imaging and decoding both 1D and 2D bar codes and postal codes. The reader 10 is also capable of capturing images and signatures. The decoder 16 may be integrated into the reader 10 or may be a separate system, as would be understood by one of skill in the art.

Figure 1:
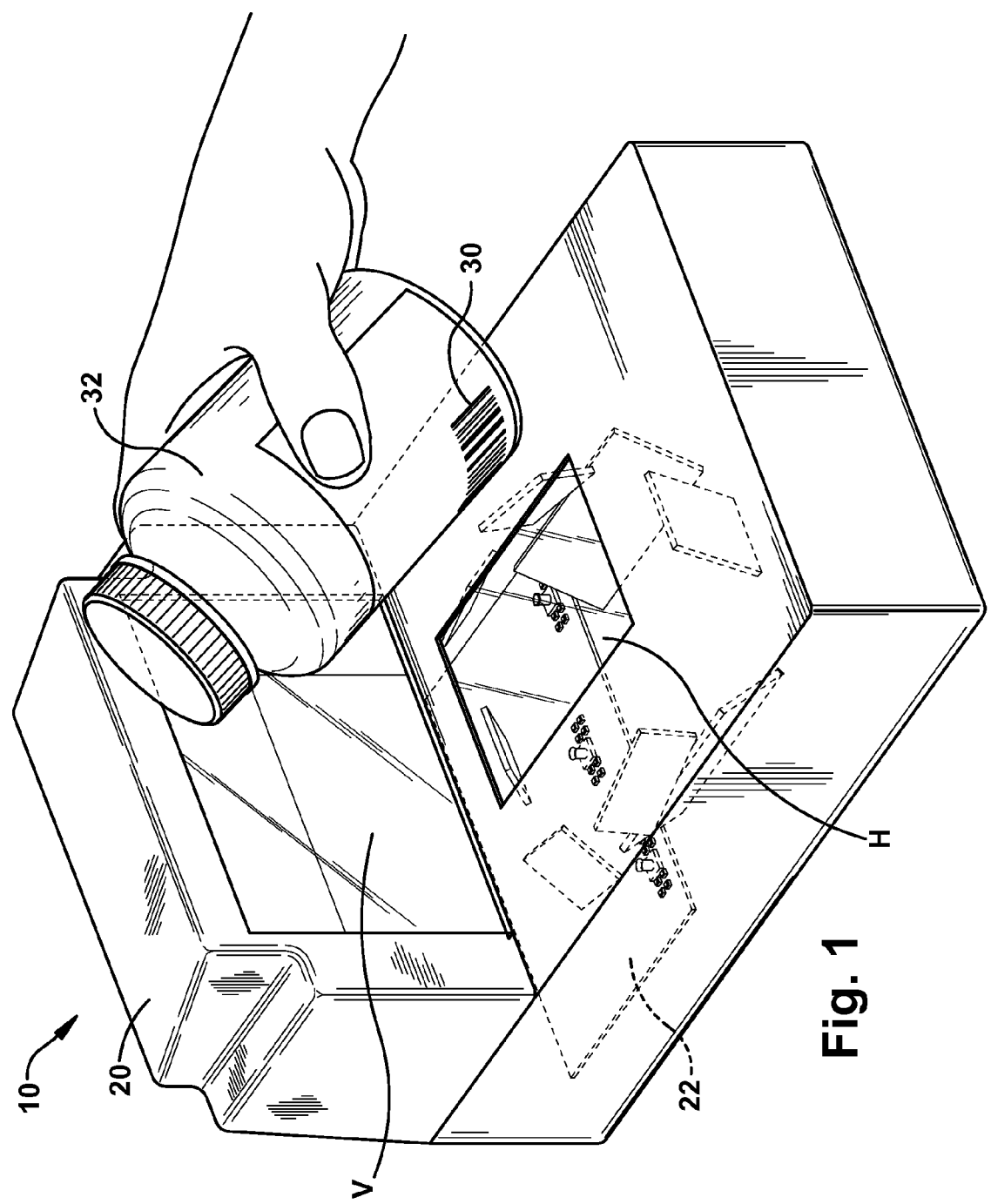
FIG. 1 is a perspective view of a bar code reader having a vertical and a horizontal window through which bar codes are viewed by multiple cameras within the reader.
Figure 2:
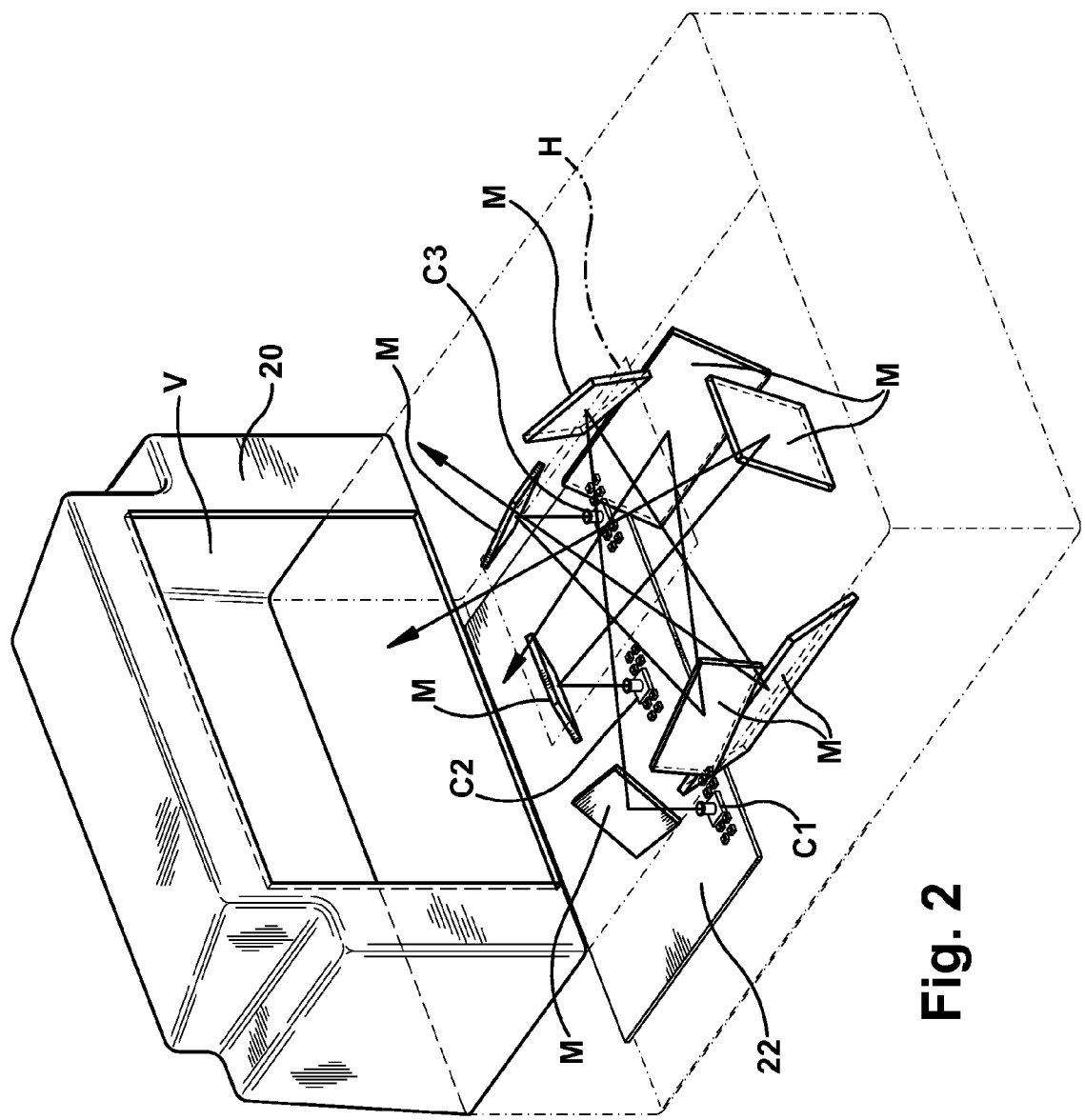
FIG. 2 is a perspective view of the reader of FIG. 1 with a portion of the reader housing removed to illustrate a plurality of cameras.
Figure 4:
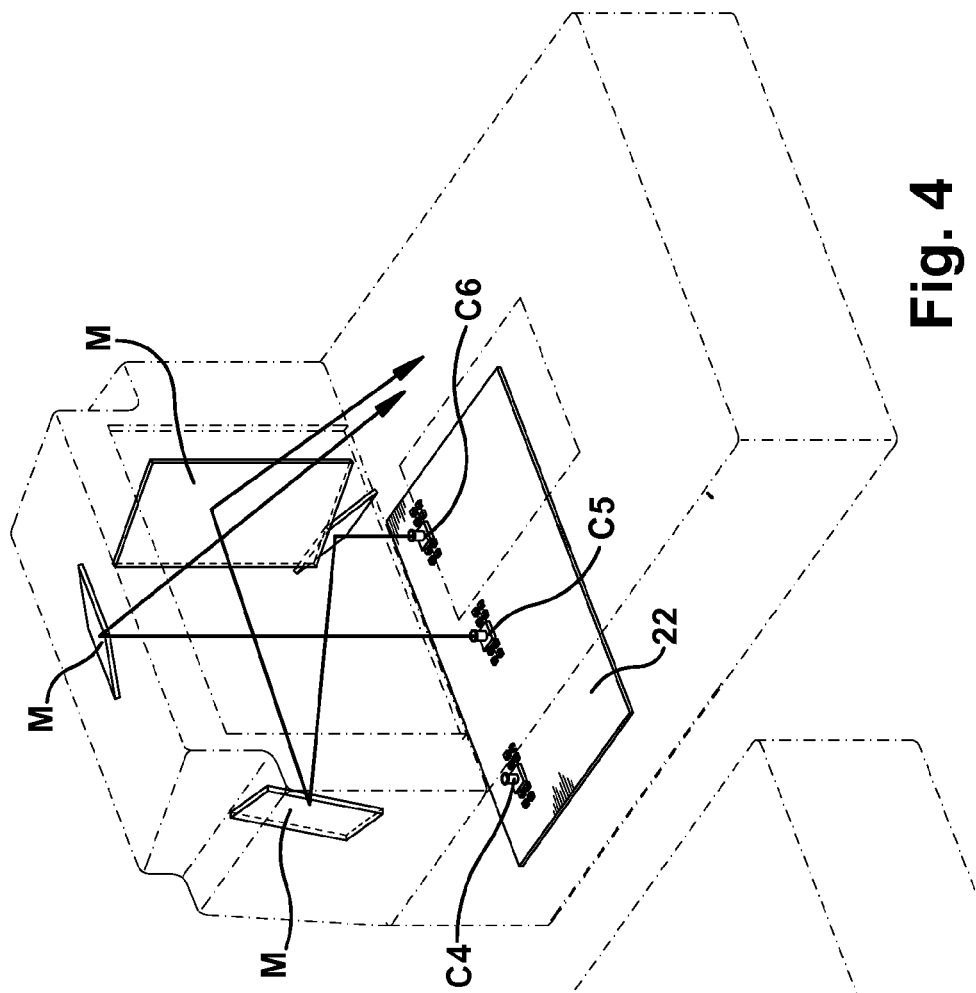
FIGS. 3 and 4 are perspective views showing a position of three additional cameras on a printed circuit board resulting in a total of six cameras.
Figure 3:
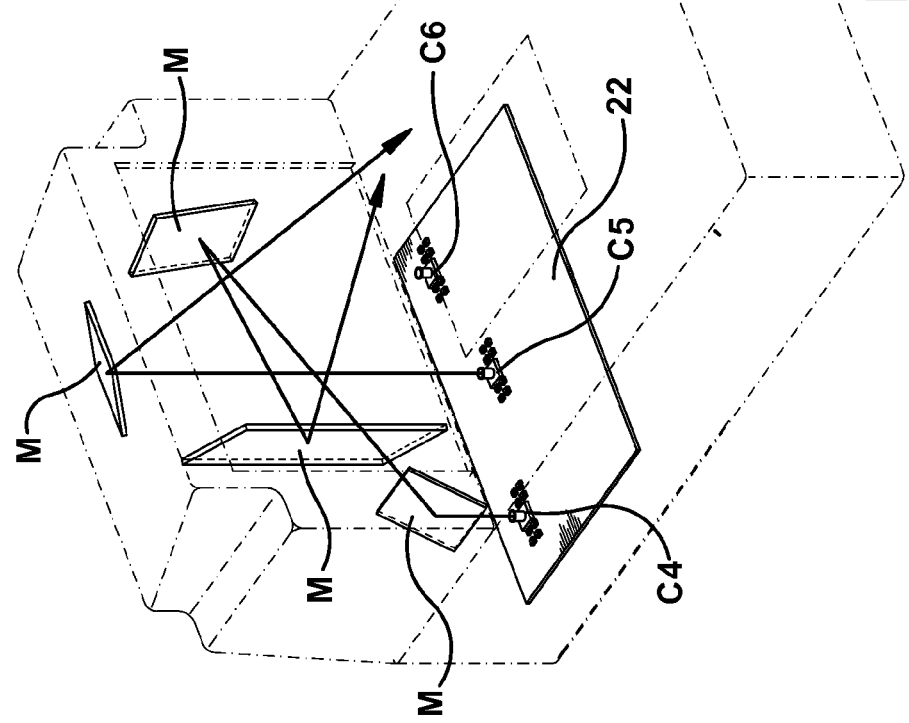

In one exemplary embodiment, the reader 10 is stationary and the image and decoder systems are supported within an interior region 18 of a housing 20 (see FIG. 1). The housing 20 may be integrated into a sales counter that of a point of sales system that includes, for example, a cash register, a touch screen visual display or other type user interface and a printer for generating sales receipts. The housing 20 depicted in FIG. 1 includes two transparent windows H,V.

In the exemplary embodiment, the cameras C1-C6 are mounted to a printed circuit board 22 inside the housing and each camera defines a two dimensional field of view FV1, FV2, FV3, FV4, FV5, FV6. Positioned behind and adjacent to the windows H,V are reflective mirrors M in that help define a given camera field of view such that the respective fields of view FV1-FV6 pass from the housing 20 through the windows creating an effective total field of view TFV for the reader 10 in a region of the windows H, V, outside the housing 20. Because each camera C1-C6 has an effective working range WR (shown schematically in FIG. 7) over which a target bar code 30 may be successfully imaged and decoded, there is an effective target area in front of the windows H,V within which a target bar code 30 presented for reading may be successfully imaged and decoded.

Figure 5:
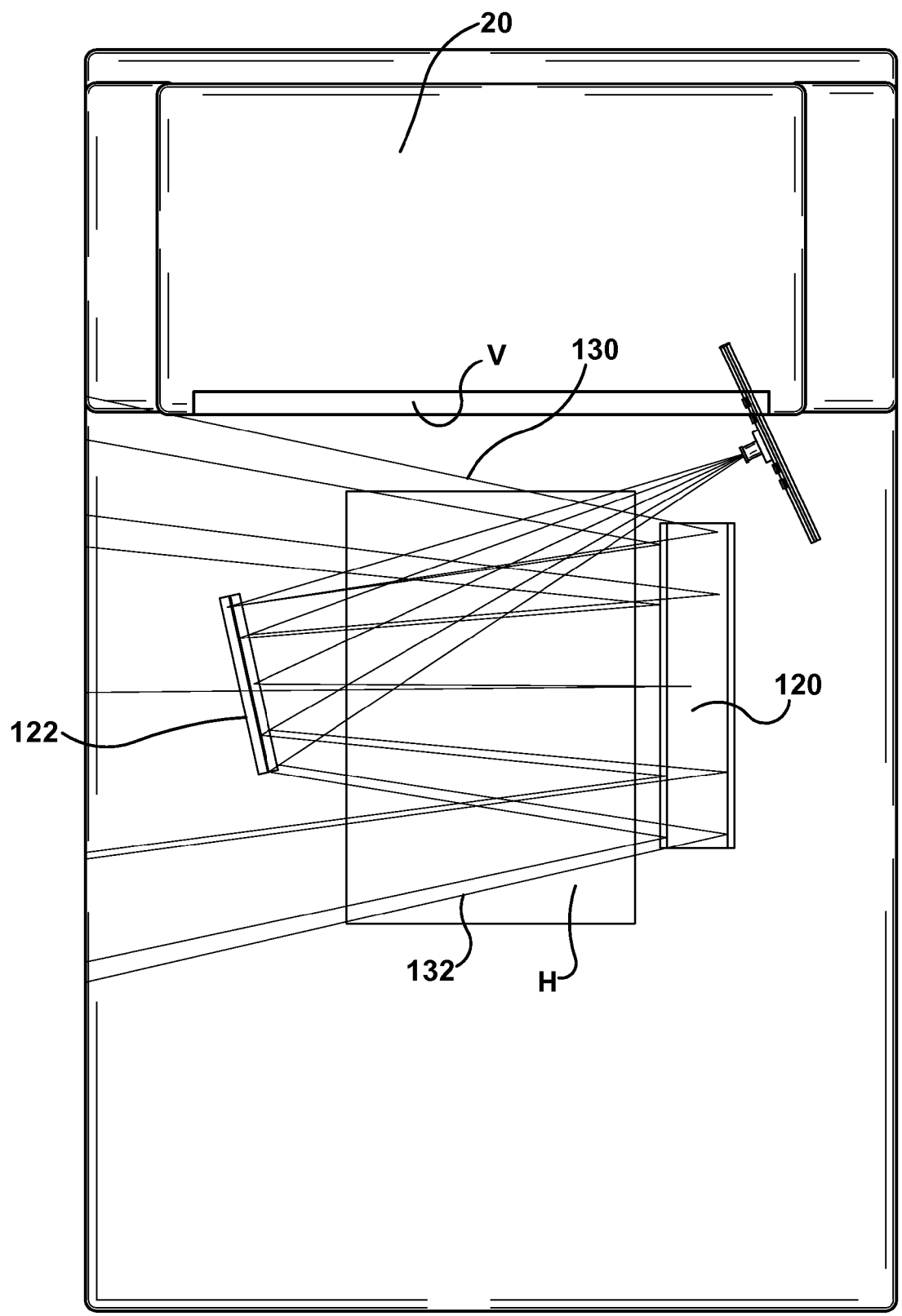
FIGS. 5 and 6 are plan views showing ray traces for cameras of a multi-camera bar code reader.
Figure 6:
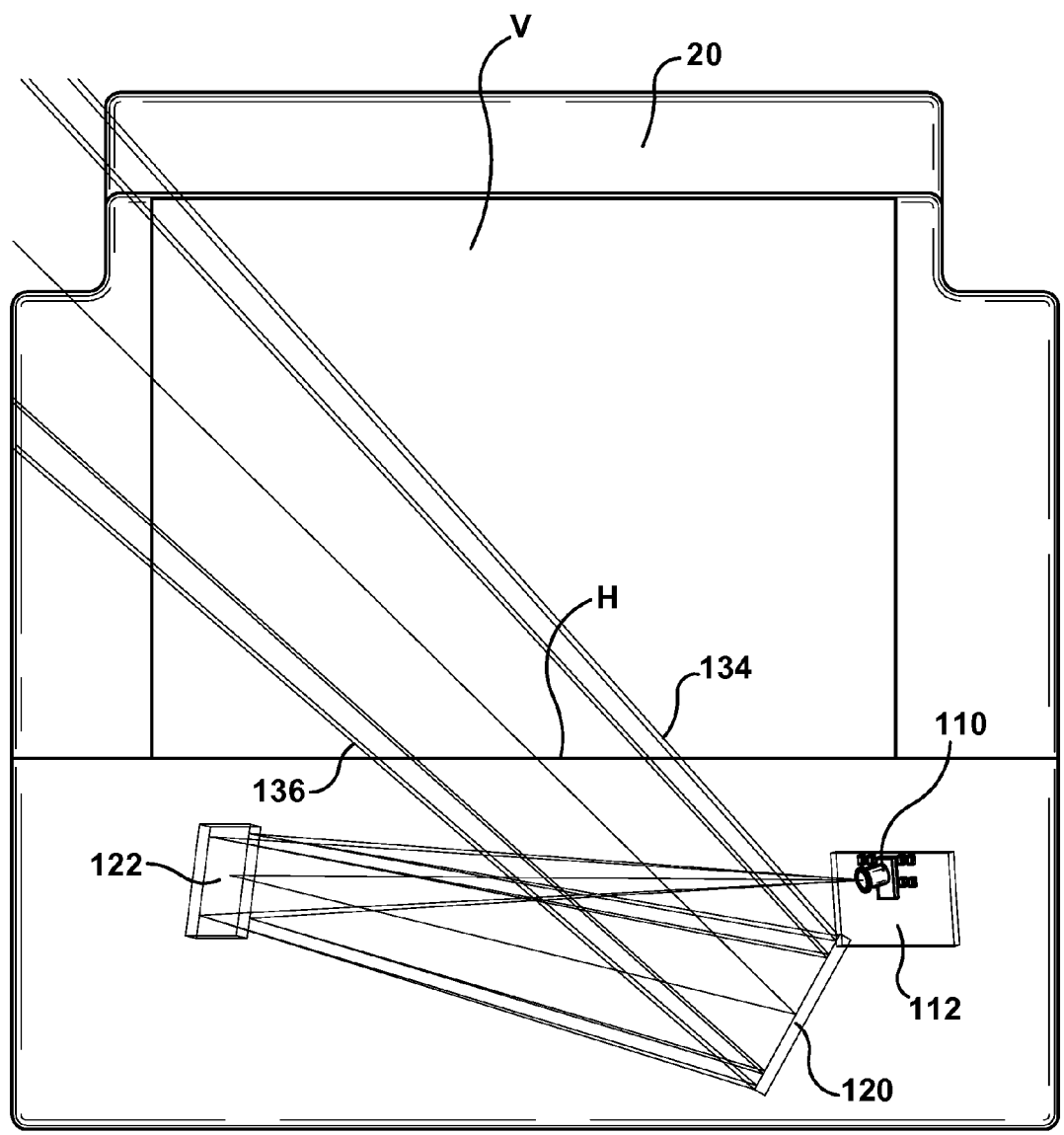

FIGS. 5 and 6 illustrate an alternative camera arrangement for a multi-camera bar code reader. One camera 110 (of a multiple number of such cameras) has a support 112 that positions the camera 110 for receipt of light from a field of view having borders or bounds 130, 132, 134, 136 and which images objects through the horizontal window H. This field of view is defined in part by two focusing mirrors 120, 122 that tend to concentrate light originating within the field of view to the camera 112. In this arrangement each camera would include its own support rather than multiple cameras on a single pc such as shown in FIG. 1.

In accordance with one use, either a sales person or a customer will present a product or target object 32 selected for purchase to the housing 20. More particularly, a target bar code 30 imprinted or affixed to the target object will be presented in a region near the windows H,V for reading, that is, imaging and decoding of the coded indicia of the target bar code. Upon a successful reading of the target bar code, a visual and/or audible signal will be generated by the reader 10 to indicate to the user that the target bar code 30 has been successfully imaged and decoded. The successful read indication may be in the form of illumination of a light emitting diode (LED) 34a (FIG. 7) and/or generation of an audible sound by a speaker 34b upon appropriate signal from the decoder 16.

Generally, upon repetitive use of the reader 10, a user (sales person or customer) will intuitively orient and move the target object toward the windows H, V in such a way that the target bar code 30 moves in relation to a given window and even a particular region of a window in the same way and same orientation time after time. As shown in FIG. 1, a typical user may orient the target object 32 such that the target bar code 30 is facing the window H and is approximately centered with respect to the window H. Thus, for this particular user, it would likely be the case that the target bar code 30 would be suitably imaged for decoding purposes generally by either the camera C1 or the camera assembly C3 which are positioned to monitor objects moved past the window H. As seen in FIG. 1, however, the object 30 is tilted so that the camera C3 is more likely to view and properly decode the bar code 30.

Even though users tend to use the same part of a window most of the time, they will sometimes use the other window, particularly when the object is too bulky to reorient to use the window that they usually use. Whenever they use the second window, people will tend to move the barcode through the same area of that window, so a preferred area for both windows can be independently determined based on statistical records. If the user most often uses, for example, the vertical window, the decoder will examine images from the most commonly used camera behind the vertical window first, in the part of the field of view of that camera where barcodes have most frequently been found. If no barcode is found, the decoder will eventually examine the images from the horizontal window, starting with the camera, and the area within the field of view of that camera where barcodes are most commonly found.

A newly installed scanner initially uses a fixed search pattern since no statistics for a particular user will have yet been gathered. Similarly, a casual user such as a customer at a checkout will not have developed a unique use pattern. The decoder 16 adopts a statistically driven pattern when enough barcodes have been decoded to reveal a pattern. The search pattern used for a new scanner can concentrate in areas found to be most frequently used by a broad cross-section of users to maximize the chances of rapidly finding the barcode even before enough data has been gathered to optimize the reader to a particular user. Stated another way, a weighted search pattern can be used to advantage even without altering the search pattern based on statistical behavior of an individual user.

Before a barcode can be decoded by an imaging barcode scanner, the barcode must be located within the field of view of the scanner. This is a computationally intensive process. Various search patterns have been devised to attempt to locate the barcode as rapidly as possible, but since people who use barcode scanners don't all behave the same way, a search pattern that works well for one user may not be optimum for another.

This is a particular issue for a reader having multiple cameras. The exemplary reader 10 uses six cameras C1-C6. Three of the cameras C4-C6, look out of a vertical window with the help of reflecting mirrors in V, and three look out of a horizontal window H. In use, a user slides a package or container 32 with a barcode through a region in front of the windows. The barcode may be visible to cameras behind the vertical window, or to cameras behind the horizontal window, or both. The barcode may move through the center of the field of view of the cameras, or through one end or the other of the field of view.

To minimize the computational effort to locate the barcode in any of the cameras, and to therefore enable a less expensive processing solution, it is desirable to find the barcode image and decode it as efficiently as possible. The bar code reader can respond faster, maximizing scanning throughput by informing the user that the barcode has decoded (with a beep or with a blinking light) as fast as possible, enabling the user to proceed to the next barcode without delay.

Each camera assembly C1-C6 of the imaging system 12 captures a series of image frames of its respective field of view FV1-FV6. The series of image frames for each camera assembly C1-C6 is shown schematically as IF1, IF2, IF3, IF4, IF5, IF6 in FIG. 7. Each series of image frames IF1-IF6 comprises a sequence of individual image frames generated by the respective cameras C1-C6. As seen in the drawings, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

The image processor or processors 14 controls operation of the cameras C1-C6. The cameras C1-C6, when operated during an imaging system, generate digital signals 35. The signals 35 are raw, digitized gray scale values which correspond to a series of generated image frames for each camera. For example, for the camera C1, the signal 35 corresponds to digitized gray scale values corresponding to a series of image frames IF1. For the camera C2, the signal 35 corresponds to digitized gray scale values corresponding to a series of image frame IF2, and so on. The digital signals 35 are coupled to a bus interface 42, where the signals are multiplexed by a multiplexer 43 and then communicated to a memory 44 in an organized fashion so that the processor knows which image representation belong to a given camera.

The image processors 15 access the image frames IF1-IF6 from memory 44 and search for image frames that include an imaged target bar code 30'. If the imaged target bar code 30' is present and decodable in one or more image frames, the decoder 16 attempts to decode the imaged target bar code 30' using one or more of the image frames having the imaged target bar code 30' or a portion thereof. A principal feature of the present disclosure is the manner in which the processor controls the capture and/or evaluation of these images.

For any individual presentation of a target bar code 30 to the reader windows H, V the exact orientation and manner of presentation of the target bar code 30 to the windows will determine which camera or cameras generate suitable images for decoding. However, based on human repetitive behavior, it is likely that, for example, sales persons generally or a given sales person, specifically, will develop a pattern of presentation of a target bar code 30 to the windows H, V that results in certain cameras having a much higher probability of generating an image frame that includes the imaged target bar code 30' and is suitable for decoding the imaged bar code 30', either alone or in conjunction with other image frames.

Each camera includes a charged coupled device (CCD), a complementary metal oxide semiconductor (CMOS), or other imaging pixel array, operating under the control of the imaging processing system 40. In one exemplary embodiment, the sensor array comprises a two dimensional (2D) CMOS array with a typical size of the pixel array being on the order of 752×480 pixels. The illumination-receiving pixels of the sensor array define a sensor array surface secured to a printed circuit board for stability. The sensor array surface is substantially perpendicular to an optical axis of the imaging lens assembly, that is, a z axis that is perpendicular to the sensor array surface would be substantially parallel to the optical axis of the focusing lens. The pixels of the sensor array surface are disposed in an orthogonal arrangement of rows and columns of pixels.

The reader circuitry 11 includes imaging system 12, the memory 44 and a power supply 11a. The power supply 11a is electrically coupled to and provides power to the circuitry 11 of the reader. Optionally, the reader 10 may include an illumination system 60 (shown schematically in FIG. 7) which provides illumination to illuminate the effective total field of view to facilitate obtaining an image 30' of a target bar code 30 that has sufficient resolution and clarity for decoding.

For each camera assembly C1-C6, the sensor array is enabled during an exposure period to capture an image of the field of view FV1-FV6 of the camera assembly. The field of view F1-FV6 is a function of both the configuration of the sensor array and the optical characteristics of the imaging lens assembly and the distance and orientation between the array and the lens assembly.

If the target bar code 30 is within the field of view of a particular camera assembly, say camera C1, each image frame of the series of image frames IF1 includes an image 30' of the target bar code 30 (shown schematically in FIG. 7). The image processors 15 and the decoding system 14 select an image frame from the series of image frames IF1-IF6 stored in the memory 44 and attempt to locate and decode a digitized, gray scale version of the image bar code 30'.

The camera assemblies C1-C6 are continuously generating respective series of image frames IF1-IF6. Since many of these captured frames IF1-IF6 will not include an imaged target bar code 30', the image processors 15 of the image processing system 14 must analyze the stored image frames IF1-IF6 in memory 44 to find and decode.

For each camera assembly C1-C6, electrical signals are generated by reading out of some or all of the pixels of the pixel array after an exposure period generating the gray scale value digital signal 35. This occurs as follows: within each camera, the light receiving photosensor/pixels of the sensor array are charged during an exposure period. Upon reading out of the pixels of the sensor array, an analog voltage signal is generated whose magnitude corresponds to the charge of each pixel read out. The image signals 35 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and coverts the analog signal into a digital signal whose magnitude corresponds to raw gray scale values of the pixels. The series of gray scale values GSV represent successive image frames generated by the camera assembly. The digitized signal 35 comprises a sequence of digital gray scale values typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

As is best seen in FIG. 7, the digital signals 35 are received by the bus interface 42 of the image processing system 40, which may include the multiplexer 43, operating under the control of an ASIC 46, to serialize the image data contained in the digital signals 35. The digitized gray scale values of the digitized signal 35 are stored in the memory 44. The digital values GSV constitute a digitized gray scale version of the series of image frames IF1-IF6, which for each camera assembly C1-C6 and for each image frame is representative of the image projected by the imaging lens assembly onto the pixel array during an exposure period. If the field of view of the imaging lens assembly includes the target bar code 30, then a digital gray scale value image 30' of the target bar code 30 would be present in the digitized image frame.

The decoding circuitry 14 then operates on selected image frames and attempts to decode any decodable image within the image frames, e.g., the imaged target bar code 30'. If the decoding is successful, decoded data 56, representative of the data/information coded in the target bar code 30 is then output via a data output port 58 and/or displayed to a user of the reader 10 via a display 59. Upon achieving a good read of the target bar code 30, that is, the bar code 30 was successfully imaged and decoded, the speaker 34b and/or an indicator LED 34a is activated by the bar code reader circuitry 11 to indicate to the user that the target bar code 30 has successfully read.

Figure 8:
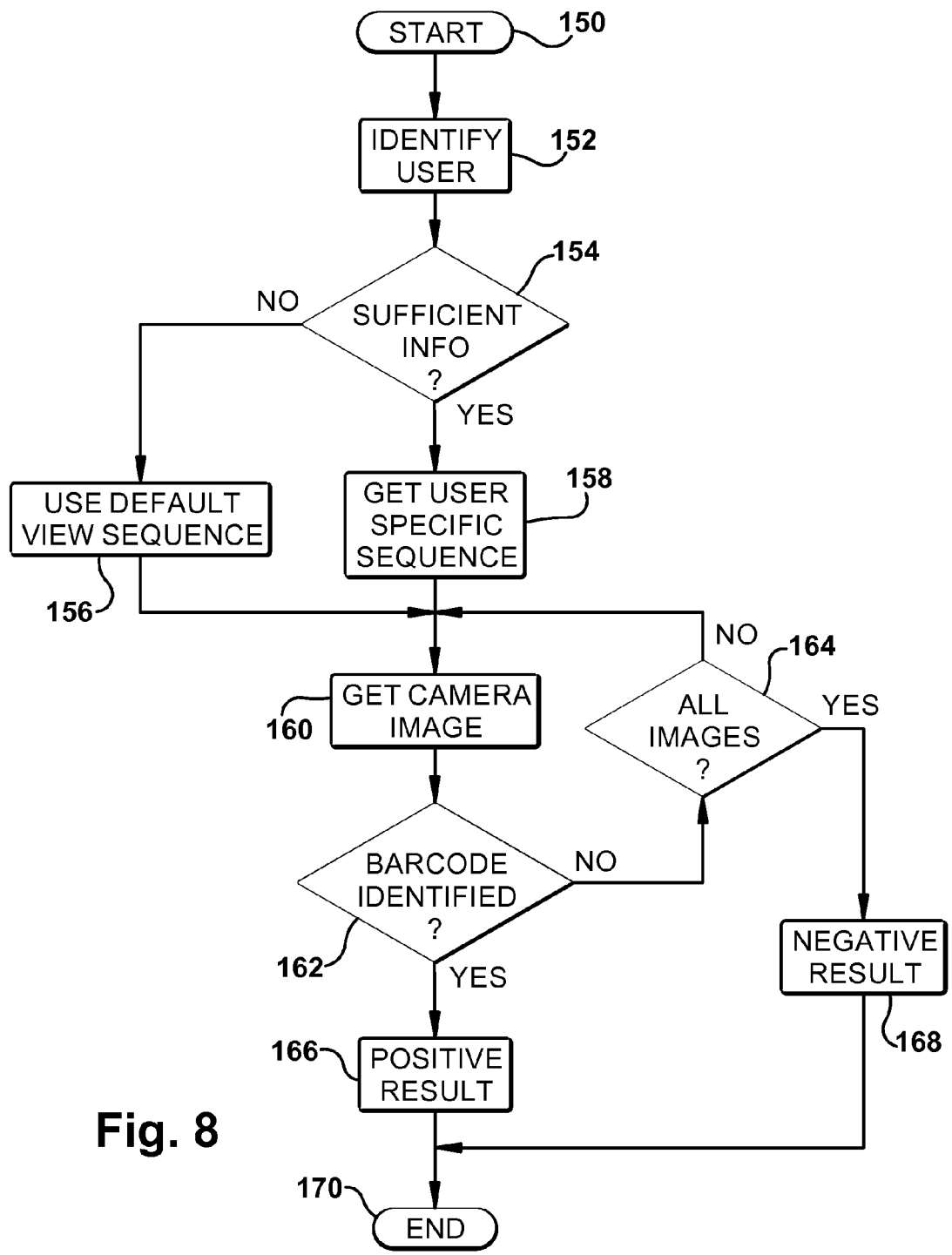
FIG. 8 is a flowchart of an exemplary embodiment of the invention.

FIG. 8 represents a flow chart of a representative method of the disclosed system. The processors 15 maintain a database of past user behavior including the frequency with which users have successful reads from different cameras within the housing. An exemplary process of enhancing bar code identification beings 150 by identifying a user 152 by scanning a user identifier or keyboard entry. The process then determines 154 if enough information has been gathered for the user to make an informed prediction regarding scan tendencies and hence the order of image monitoring. If the user has insufficient data, the processors 15 use a default sequence 156 which is still better than brute force evaluation of all images in no particular order.

If enough information for a user is available, the processors 15 access 158 the database and gather a preferred image evaluation sequence. A goal of the process of FIG. 8 is to decode a bar code with greatest efficiency. A first camera image is evaluated 160. If a bar code is identified in this first image at a test 162, a positive result is indicated 166 to the user and the process ends 170.

One process would preferentially gather the images from the camera in a specified order with the most likely camera being chosen for a first set of images. The time delay in gathering and storing all images, however, may not be great. A bigger delay is evaluating the images to determine a presence of a bar code. Thus, the act of preferentially getting an image 160 most typically determines which images from a set of images gathered and stored very quickly is in determining which camera image in the sequence of stored images to check first and in what order other images are to be checked. Once a barcode is found it is decoded and the information stored or transmitted. The process can fail to find a barcode. If a determination is made 164 that all stored images are evaluated and no barcode found then a negative result is indicated 168 and either another image capture sequence performed or the information may be entered by the user manually via a keyboard of the like.

While the present invention has been described with a degree of particularity, it is the intent that the invention includes all modifications and alterations from the disclosed design falling within the spirit or scope of the appended claims.

I claim:

1. A multi-camera imaging-based bar code reader for imaging a target bar code on a target object, the bar code reader comprising:
   a housing supporting one or more transparent windows and defining an interior region, a target object being presented in relation to the housing for imaging a target bar code;
   an imaging system including a plurality of cameras wherein each camera is positioned within the housing interior region and defines a field of view which is different than a field of view of each other camera of the plurality of cameras, each camera including a sensor array; and
   an image processing system comprising a processor having a stored program for adjusting a bar code search sequence based on user tendancies to enhance identification of a barcode within a bar code reader field of view.

2. The bar code reader of claim 1 wherein the plurality of windows includes at least one substantially vertically oriented window and one substantially horizontally oriented window.

3. The bar code reader of claim 1 wherein the processing system determines an optimum order of image capture.

4. The bar code reader of claim 1 wherein the processing system determines an optimum order of image evaluation.

5. A method of operating a multi-camera imaging-based bar code reader for imaging a target bar code comprising:
   providing an imaging-based bar code reader including a housing supporting one or more transparent windows and defining an interior region;
   positioning a plurality of cameras having sensor arrays within the housing interior to define different fields of view for each of said plurality of cameras;
   moving a target object having a target bar code into a position within one or more camera fields of view; and
   interpreting images from the multiple cameras in an order based on user behavior in moving objects into a bar code reader field of view.

6. The bar code reader method of claim 5 comprising maintaining a database of past user behavior, checking the database to determine if sufficient information exists regarding a present user, obtaining or interpreting camera images based on an order determined from the database and evaluating the images to determine if a barcode has been identified.

7. The method of claim 6 wherein if insufficient data is available for a present user, a default order of image capture or interpretation is performing while identifying bar code images.

8. The method of claim 6 wherein image acquisition from cameras is interleaved between the multiple cameras and image interpretation is prioritized based on user tendancies.

9. The method of claim 6 wherein an order of image acquisition is adjusted based on user tendancies.

10. An imaging system for use in multicamera imaging-based bar code reader having a housing supporting a plurality of transparent windows and defining an interior region, a target object being presented to the plurality of windows for imaging a target bar code on a target object, the imaging system comprising:
   a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array; and one or more processors for prioritizing an order of image capture and interpretation based upon user tendancies.

11. The imaging system of claim 10 wherein the plurality of windows includes at least one substantially vertically oriented window and one substantially horizontally oriented window.

12. The imaging system of claim 10 wherein the one or more processors determines an optimum order of image capture.

13. The imaging system of claim 10 wherein the one or more processors determines an optimum order of image evaluation.

14. A multi-camera imaging-based bar code reader for imaging a target bar code on a target object, the bar code reader comprising:

housing means supporting a plurality of transparent windows and defining an interior region bounded in part by the plurality of windows for imaging a target bar code;

imaging means including a plurality of camera assemblies means coupled to an image processing system means wherein each camera assembly means of the plurality of camera assemblies means is positioned within the housing interior and define a field of view which is different than a field of view of each other camera assembly means of the plurality of camera assemblies means;

sensing means for each camera assembly means including a sensor array and an imaging lens assembly for focusing the field of view of the camera assembly means onto the sensor array;

memory means for storing images from the sensing means;

processing means for determining an optimum order of image capture and storage and evaluation based on past user imaging tendancies; and decoder means for evaluating said images for a content of an identified bar code.

15. Computer-readable media having computer-executable instructions for performing a method of operating a multicamera imaging-based bar code reader for imaging a target bar code on a target object, the steps of the method comprising:

operating the reader to image a target bar code on a target object for multiple camera assemblies by capturing multiple images from each such assembly and storing said images and evaluating the images so stored in an order based on past user behavior in presenting objects to a reader.

16. The computer-readable media of claim 15 additionally comprising instructions for alerting a user of the results of the evaluation.

17. The computer-readable media of claim 16 additionally comprising instructions for transmitting data corresponding to a bar code content to an external device.

* * * * *